Patented Jan. 21, 1969

3,423,420
HERBICIDAL 1-SUBSTITUTED 2,4,5-TRIBROMO-IMIDAZOLES
Karl H. Büchel, Hangelar, Wilfried Draber, Ippendorf, and Friedrich W. A. G. K. Korte, Hangelar, Germany, assignors to Shell Oil Company, New York, N.Y., a corporation of Delaware
No Drawing. Filed Aug. 2, 1965, Ser. No. 476,719
Claims priority, application Germany, Aug. 7, 1964,
S 92,531
U.S. Cl. 260—309          11 Claims
Int. Cl. C07d 49/36; A01n 9/22

ABSTRACT OF THE DISCLOSURE

Herbicidal 1-substituted 2,4,5-tribromoimidazoles, herbicidal compositions containing them and methods for their use as herbicides.

---

This invention relates to novel compounds useful as herbicides, herbicidal compositions and to methods for controlling unwanted plant growth. In particular this invention is concerned with the control of undesired vegetation with novel 2,4,5-tribromoimidazole compositions.

The need for effective agents to control unwanted vegetation in modern agricultural practice is now well established. In addition, such chemical agents are useful in the control of vegetation in industrial areas, along railroad sidings, along highways and the like.

It is therefore an object of the present invention to provide novel compounds which are effective for the control of unwanted vegetation.

It is a further object of the invention to provide a novel class of chemical compounds highly effective as herbicides and yet safe to apply at effective dosages.

A still further object of the invention is the provision of a novel class of useful herbicides which are relatively inexpensive at effective dosage levels when compared to presently available commercial plant growth regulators.

A yet another object of the present invention is to provide herbicidal compositions useful for the destruction of unwanted vegetation and to provide a useful method for the eradication and/or control of weeds.

These and other objects are accomplished by the novel imidazoles of the invention, the herbicidal compositions and their method of use. In accordance with this invention, imidazoles of the following formula have been found to be active herbicides with various species thereof exhibiting a variety of desirable characteristics. At moderate dosages, all are general herbicides, preventing growth of broad-leaved and narrow-leaved plants, while at low dosages many are quite selective, permitting control of weeds in crops. These 2,4,5-tribromoimidazoles have the general formula:

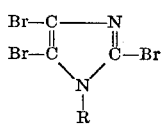

where R contains up to 10 carbon atoms and is benzoyl or benzenesulfonyl, or benzoyl or benzenesulfonyl substituted by at least one substituent selected from the group consisting of alkyl of 1 to 4 carbon atoms, alkoxy of 1 to 4 carbon atoms, nitro, chlorine or bromine; R may also be a chloromethyl, a bromoethyl group, a hydroxy methyl or an acetoxy methyl group.

Typical examples of species of the imidazole herbicides of this invention include for example:

2,4,5-tribromo-1-benzoyl imidazole
2,4,5-tribromo-1-(p-chlorobenzoyl)imidazole
2,4,5-tribromo-1-(m-bromobenzoyl)imidazole
2,4,5-tribromo-1-(o,p-dibromobenzoyl)imidazole
2,4,5-tribromo-1-(p-nitrobenzoyl)imidazole
2,4,5-tribromo-1-(p-methoxybenzoyl)imidazole
2,4,5-tribromo-1-(p-ethoxybenzoyl)imidazole
2,4,5-tribromo-1-(m-butoxybenzoyl)imidazole
2,4,5-tribromo-1-(ethylbenzoyl)imidazole
2,4,5-tribromo-1-(isopropylbenzoyl)imidazole
2,4,5-tribromo-1-benzene sulfonyl imidazole
2,4,5-tribromo-1-(p-chlorobenzene sulfonyl)imidazole
2,4,5-tribromo-1-(p-bromobenzene sulfonyl)imidazole
2,4,5-tribromo-1-(o,p-dibromobenzene sulfonyl)imidazole
2,4,5-tribromo-1-(m-nitrobenzene sulfonyl)imidazole
2,4,5-tribromo-1-(p-toluene sulfonyl)imidazole
2,4,5-tribromo-1-(o-butylbenzene sulfonyl)imidazole
2,4,5-tribromo-1-(p-methoxybenzene sulfonyl)imidazole Preferred because of useful herbicidal activity are imidazoles wherein R is a benzoyl or benzene sulfonyl group substituted in the para position by a substituent selected from the group consisting of hydrogen, methyl, methoxy, nitro or chlorine. Such active herbicides include:

2,4,5-tribromo-1-benzoyl imidazole
2,4,5-tribromo-1-(p-chlorobenzoyl)imidazole
2,4,5-tribromo-1-(p-nitrobenzoyl)imidazole
2,4,5-tribromo-1-(p-methylbenzoyl)imidazole
2,4,5-tribromo-1-(p-methoxybenzoyl)imidazole
2,4,5-tribromo-1-benzene sulfonyl imidazole
2,4,5-tribromo-1-(p-chlorobenzene sulfonyl)imidazole
2,4,5-tribromo-1-(p-nitrobenzene sulfonyl)imidazole
2,4,5-tribromo-1-(p-toluene sulfonyl)imidazole
2,4,5-tribromo-1-(p-methoxybenzene sulfonyl)imidazole Also preferred because of their effectiveness as herbicides are those compositions containing the imidazoles of the above formula wherein R is hydroxymethyl, acetoxy methyl, chloromethyl or bromomethyl, that is:

2,4,5-tribromo-1-hydroxymethyl imidazole
2,4,5-tribromo-1-acetoxy methyl imidazole
2,4,5-tribromo-1-chloromethyl imidazole
2,4,5-tribromo-1-bromomethyl imidazole The imidazole herbicides according to the invention may be prepared by the method of Ruggli, Helv. Chim. Acta 3:559 (1920).

The following examples are presented to illustrate the preparation of typical imidazoles and to illustrate the manner in which the invention may be carried out. Parts given in the preparations are parts by weights unless otherwise noted.

EXAMPLE I

Preparation of 2,4,5-tribromo-1-(p-chlorobenzene sulfonyl)imidazole 305 parts (1 mol) of 2,4,5-tribromo imidazole was dissolved in 2,500 parts by volume of anhydrous acetonitrile. To this solution, 1 mol of potassium-tert-butylate was added, and the solution was stirred until complete dissolution occurred (if necessary, filtering may take place, in which case air should be excluded). A solution of 211 parts (1 mol) of p-chlorobenzene sulfochloride in 1,200 parts by volume of acetonitrile (anhydrous) was then added dropwise over 2½ hours with stirring at room temperature. Stirring was continued for a further hour. The solution was then heated to 60° C. and the precipitated potassium chloride removed by suction. The filtrate was concentrated as a result of which the product precipitated. The removal by suction was repeated several times and the residue was washed in each case with small quantities of cold acetonitrile which were added to the filtrate, which was then further concentrated. After concentration to a final 150 parts by volume a total of 320 parts (67% of theory) of a white product having a melting point of 138–140° C. was obtained. Thin layer chromatography showed that the substance was free from tribromo imidazole.

EXAMPLE II

Preparation of 2,4,5-tribromo-1-(p-toluene sulfonyl) imidazole

A quantity of 30.5 parts (0.1 mol) 2,4,5-tribromo imidazole was dissolved in 200 parts by volume of anhydrous acetonitrile and the solution mixed with a suspension of 0.1 mol of potassium-tert-butylate in acetonitrile. A solution of 19 parts of p-toluene sulfochloride in 200 ml. of acetonitrile was then added dropwise at room temperature. The solution was stirred for several hours until it showed a neutral reaction. The solution was then heated to boiling temperature and filtered. The filtrate was cooled. The precipitated crystals were removed by suction and washed with a small amount of cold acetonitrile. Colorless flakes having a melting point of 157–159° (decomposition) were obtained. The yield was 23.2 parts (50% of theory). By concentrating the mother liquor a further 10–15 parts of a less pure product were obtained.

EXAMPLE III 2,4,5-tribromo-1-benzene-sulfonyl imidazole

The 2,4,5-tribromo-1-benzene sulfonyl imidazole was prepared in a manner similar to that of Examples 1 and 2. It melted at 145° C. The yield was 80% of theory.

EXAMPLE IV 2,4,5-tribromo-1-benzoyl imidazole

The preparation was carried out in a manner similar to that of Examples I to III. Benzoyl chloride was used as the acid halide. The yield was 65% of theory. Melting point 101° C.

EXAMPLE V 2,4,5-tribromo-1-p-methoxybenzoyl imidazole

The preparation was carried out in a manner similar to that of Examples I to IV. p-Methoxybenzoyl chloride was used as the acid halide. The product melted at 141–2° C.

EXAMPLE VI 2,4,5-tribromo-1-p-nitrobenzoyl imidazole

The preparation was carried out in a manner similar to that of Examples I to V, except that sodium ethylate was used instead of potassium-tert-butylate. p-Nitrobenzoyl chloride was used as acid halide. The yield was 60%; melting point 181–183° C.

EXAMPLE VII 2,4,5-tribromo-1-hydroxymethyl imidazole 152.5 parts (0.5 mol) of 2,4,5-tribromo imidazole was dissolved in 350 parts by volume of ethanol and mixed with 43.5 parts (0.5 mol) of morpholine. The mixture was then cooled, the morpholine salt removed by suction and washed with a small amount of cold alcohol and ether. Yield: 193 parts=98.5%.

The morpholine salt was then thoroughly dried and suspended in the form of a fine powder in 400 ml. of water. 75 parts (1.0 mol) of aqueous formaldehyde (40%) was then added, and the mixture shaken overnight. The next morning the product was removed by suction, washed with water and dried. Yield based on the salt: approximately 150 parts=90%; melting point 150–151° C. (decomposition).

EXAMPLE VIII 2,4,5-tribromo-1-acetoxy methyl imidazole

The compound was obtained from the hydroxy methyl derivative described in Example VII by heating with acetic anhydride. Yield 72% of theory; melting point 65° C.

EXAMPLE IX 2,4,5-tribromo-1-chloromethyl imidazole

A quantity of 167.5 parts (0.5 mol) of 2,4,5-tribromo-1-hydroxy-methyl imidazole was very thoroughly dried and introduced into a mixture which had been cooled to 0° C. and consisted of 500 parts by volume of dry dimethylformamide and 71.5 parts (0.6 mol) of thionyl chloride. The mixture was stirred for 3 hours at room temperature and for one hour at 100° C. The mixture was then cooled and poured onto 1000 parts of ice and 100 parts by volume of 10-n NaOH. The crude tribromo-1-chloromethyl imidazole was then removed by suction, washed with water and dried. Yield: 65%; melting point 85–87° C. Purification was effected by sublimating the substance in high vacuum at a bath temperature of 80–90° C.; melting point 87° C.

EXAMPLE X 2,4,5-tribromo-1-bromomethyl imidazole

The preparation was carried out in a manner similar to that described in Example IX, except that $POBr_3$ was used instead of $SOCl_2$. The resulting product melted at 107° C.

EXAMPLE XII

Tests with nutrient solution

The effect of the imidazoles on the increase and the growth of leaf cells was determined by placing sterile duck weed (*Lemna minor*) in a sterile Hoagland nutrient solution containing 1% of sucrose and 1 or 10 p.p.m. (parts by weight per million) of imidazole. The plants were subsequently exposed to constant light at a temperature of 24° C. After 14 days when the test plants covered the surface of the solution, the growth-hindering effect of the active component was evaluated and recorded on a scale of from 0 to 9, 0 signifying no effect and 9 complete destruction of all plants.

In further tests brome grass (*Bromus tectorum*) seedlings were grown in a porous medium under the same light-exposure and temperature conditions and only the roots protruding into the nutrient solution which contained 1 or 10 p.p.m. of the active component. The results of the tests and of the comparative tests are summarized in the following table.

TABLE I

| Active component | Lemna, p.p.m. | | Bromus, p.p.m. | |
|---|---|---|---|---|
| | 1 | 10 | 1 | 10 |
| 2,4,5-tribromo-1-(p-nitrobenzoyl) imidazole | 9 | 9 | 3 | 8 |
| 2,4,5-tribromo-1-benzoyl imidazole | 9 | 9 | 2 | 8 |
| 2,4,5-tribromo-1-(p-methoxybenzoyl) imidazole | 9 | 9 | 2 | 8 |
| 2,4,5-tribromo-1-(p-chlorobenzene sulfonyl)imidazole | 9 | 9 | 3 | 8 |
| 2,4,5-tribromo-1-benzene sulfonyl imidazole | 8 | 9 | 1 | 8 |
| 2,4,5-tribromo-1-(p-toluene sulfonyl) imidazole | 9 | 9 | 2 | 7 |
| 2,4,5-tribromo-1-hydroxymethyl imidazole | 9 | 9 | 1 | 8 |
| 2,4,5-tribromo-1-acetoxy methyl imidazole | 9 | 9 | | 8 |
| 2,4,5-tribromo-1-chloromethyl imidazole | 8 | 9 | | 7 |
| 2,4,5-tribromo-1-bromomethyl imidazole | 9 | 9 | | 8 |

EXAMPLE XIII

Soil test

Vessels were filled with moist, sterile soil. Soil mixed with active component in amounts corresponding to 1 to 10 pounds per acre was then placed on the surface of the moist soil. Small, approximately equal amounts of seed of the test plants were placed on the surface of the toxically impregnated soil in each vessel. The seed was subsequently covered with moist sterile soil and then watered. The vessels were kept in a greenhouse for 14 days under identical conditions. The effect of the imidazoles was determined by visual observation of any plants found to be growing. Each test series also comprised a comparative test without herbicide.

In carrying out the test series seeds of the following plants were used: Cress (*Lepidium sativum*), a broadleaved plant, and cockspur grass (Echinochloa), a narrow-leaved plant.

The results of the test series are shown in Table II.

this manner a wide dosage series of each compound was applied and the dosage required to give 95 percent control of each of the five weed species was determined. These results set forth in Table IV shows that 2,4,5-tribromo-1-hydroxymethyl imidazole and 2,4,5-tribromo 1-acetoxy methyl imidazole are highly effective foliar herbicides in field 10 applications.

TABLE IV.—WEED CONTROL IN FIELD TESTS
[$LD_{95}$ in pounds/acre]

| Compound | Annual Meadow Grass | Amsinckia Douglasiana | Red Maids | Sand-wort | Dead Nettle |
| --- | --- | --- | --- | --- | --- |
| 2,4,5-tribromo-1-hydroxymethyl imidazole | 1.4 | >1 | >1 | >1 | 1.4 |
| 2,4,5-tribromo-1-acetoxy methyl imidazole | 3.5 | >1 | >1 | >1 | 1.2 |

TABLE II

| Active component | Lepidium, lbs./A | | Echinochloa, lbs./A | |
| --- | --- | --- | --- | --- |
| | 1 | 10 | 1 | 10 |
| 2,4,5-tribromo-1-(p-nitrobenzoyl) imidazole | 9 | 9 | | 8 |
| 2,4,5-tribromo-1-benzoyl imidazole | 8 | 9 | 5 | 8 |
| 2,4,5-tribromo-1-(p-methoxybenzoyl) imidazole | 8 | 9 | | 8 |
| 2,4,5-tribromo-1-(p-chlorobenzene sulfonyl)imidazole | 9 | 9 | | 8 |
| 2,4,5-tribromo-1-benzene sulfonyl imidazole | 8 | 9 | | 8 |
| 2,4,5-tribromo-1-(p-toluene sulfonyl) imidazole | 9 | 9 | | 8 |
| 2,4,5-tribromo-1-hydroxymethyl imidazole | 9 | 9 | 6 | 9 |
| 2,4,5-tribromo-1-acetoxy methyl imidazole | 9 | 9 | | 9 |
| 2,4,5-tribromo-1-chloromethyl imidazole | 5 | 9 | | 7 |
| 2,4,5-tribromo-1-bromomethyl imidazole | 5 | 9 | | 7 |

EXAMPLE XIV

Spray test

The effect of imidazoles according to the invention sprayed on the surface of growing plants was determined.

A mixture containing 2.5% by weight of the test substance in 20 cc. of water and 1% by weight of "Tween 20" (polyoxyethylene sorbitan 20 monolaurate as surface-active agent, was sprayed on the test plants in amounts corresponding to 1 and 10 pounds of the imidazole compound per acre.

Test plants were: foxtail (*Amaranthus retroflexus*) and paniclegrass (*Digitaria sanguinalis*). The plants were in a greenhouse; the results of the spray test were determined by inspection of the plants two weeks after spraying.

TABLE III

| Active Component | Amaranthus, lbs./A | | Digitaria, lbs./A | |
| --- | --- | --- | --- | --- |
| | 1 | 10 | 1 | 10 |
| 2,4,5-tribromo-1-(p-nitrobenzoyl) imidazole | 9 | 9 | 9 | 9 |
| 2,4,5-tribromo-1-benzoyl imidazole | 9 | 9 | 9 | 9 |
| 2,4,5-tribromo-1-(p-methoxybenzoyl) imidazole | 7 | 9 | 8 | 9 |
| 2,4,5-tribromo-1-(p-chlorobenzene sulfonyl)imidazole | 9 | 9 | 9 | 9 |
| 2,4,5-tribromo-1-benzene sulfonyl imidazole | 9 | 9 | 9 | 9 |
| 2,4,5-tribromo-1-(p-toluene sulfonyl) imidazole | 3 | 9 | 9 | 9 |
| 2,4,5-tribromo-1-hydroxymethyl imidazole | 9 | 9 | 9 | 9 |
| 2,4,5-tribromo-1-acetoxymethyl imidazole | 9 | 9 | 9 | 9 |
| 2,4,5-tribromo-1-chloromethyl imidazole | | 7 | | 4 |
| 2,4,5-tribromo-1-bromomethyl imidazole | | 9 | | 9 |

EXAMPLE XV

Field tests

Two of the imidazoles of the invention were tested as foliar sprays to control five species of weeds. The compounds were formulated as emulsifiable concentrates and applied to the weeds with a logarithmic sprayer. In

EXAMPLE XVI

In order to prepare a wettable powder 20 parts by weight of the relevant imidazole derivative of the invention were throughly mixed with 8 parts by weight of "Belloid T.D." (condensation product of formaldehyde and alkyl aryl sulfonate) and 72 parts by weight of kaolin. Water may be added to this composition to form a suitable dispersion for use in horticulture.

EXAMPLE XVII

In order to prepare a dust, 4 parts by weight of the imidazole derivative were intimately mixed with 1 part by weight of Mg-stearate, 58 parts by weight of kaolin and 37 parts by weight of gypsum.

EXAMPLE XVIII

In order to prepare an emulsifiable concentrate, 25 parts by weight of the imidazole derivative were dissolved in 65 parts by weight of toluene and 10 parts by weight of "Ethylan SE." The emulsifier, "Ethylan SE," is a mixture of lauric diethanol amide and a condensate of octyl phenol and ethylene oxide.

Different species of the imidazole herbicides of this invention exhibit somewhat different herbicidal properties, compared one with another. Further, their activity with respect to different kinds of plants differs considerably, permiting their use as selective herbicides in many cases. When used in relatively high dosages, these herbicides are powerful general herbicides, apparently exhibiting more activity when applied pre-emergence than when applied post-emergence. At lower dosages, the herbicides act selectively.

The imidazole herbicides of this invention are not very volatile, and tend to remain in that part of the soil into which they are introduced; some may be moved through the soil by water. Consequently, by appropriate selection of the part of the soil into which they are introduced, relative to the seeds of wanted plants, and those of unwanted plants, and taking into account the effect of water, these herbicides can be used to prevent all plant growth, even at relatively low dosages in some cases, or their selectivity can be improved to prevent growth of unwanted plants without harm to wanted plants. For example, as is well known, only those weed seeds which are present within about one-quarter inch of the surface of the soil will germinate, whereas the seeds of cereal, and other, crops, for example, ordinarily are sown about one-half to three-quarters of an inch below the surface of the soil, and germinate well under these conditions. By introducing the imidazole herbicides only into the top one-quarter inch of the soil, and avoiding excessive watering, germination of the weed seeds can be prevented, while germination of the crop seeds will not be affected. Thus, even those of the imidazole herbicides of this invention that are not very selective in their action can be used to selectively remove weeds from cereal grains or other crops. Of course, if complete kill of all plants in a given portion of soil is described, it is necessary only to introduce one or more of the imidazole herbicides throughout that portion of soil.

Herbicidal compositions according to the invention may be either liquid or solid. They may contain approximately 0.01 percent of the active imidazole compound to as much as 90 percent of the active imidazole compound by weight of the total finished formulation. The quantity of active ingredient in the formulation will depend upon the particular type of formulation, the particular species of unwanted vegetation to be controlled, the type of application and other factors known to those versed in the application of herbicides.

The imidazoles are soluble in the common organic horticultural solvents. Thus, according to the intended method of application, the character of the plants involved, and the concentration of herbicide to be used, the herbicidal imidazole can be formulated as a solution or suspension in water, or a suitable nonphytotoxic organic solvent, as a dispersion or emulsion of the active agent in a non-solvent therefor, as an emulsion of a solution of the active agent in a suitable solvent emulsified with a second, inhomogeneous liquid, or as a solid comprising the active agent or agents sorbed on a sorptive solid carrier. Where a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, oils of animal or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such to the plants or to the soil that is to be treated, or they may be suspended in water and the suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agents as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts, for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example, Triton X-100 and Lissapol N—believed to be condensation products of alkylphenols with ethylene oxide—and Tweens—believed to be condensation products of ethylene oxide and higher fatty acid esters, for example, oleic acid ester of anhydrosorbitols.

Liquid compositions of these herbicidal imidazoles suitable for application to plants or to their environment contain the active agent or agents in concentrations generally within the range of from about 0.01% by weight to about 25% by weight.

The invention includes novel solid compositions of matter wherein the active agent or agents are absorbed or adsorbed in or on a sorptive carrier, such as finely divided clay, talc, gypsum, lime, wood flour, fuller's earth, kieselguhr, or the like. The solid composition, or dust, may contain from as little as 1% by weight of active material to 75% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.5 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain one or more of the herbicidal imidazoles set out hereinbefore as the sole active agent, or they may contain in addition thereto other biologically active substances. Thus, insecticides, e.g., DDT, endrin, dieldrin, aldrin, chlordane, demeton, methoxychlor, DDVP, naled, Ciodrin® insecticide and Bidrin® insecticide, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners other plant regulators, such as naphthaleneacetic acid, 2,4-dichlorophenoxyacetic acid and the like, and/or herbicides of different properties.

We claim as our invention:
1. A compound of the formula

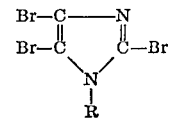

wherein R is of up to 10 carbon atoms and is
mono-substituted benzoyl wherein the substituent is alkyl of 1-4 carbon atoms, alkoxy of 1-4 carbon atoms, nitro, chlorine or bromine;
mono-substituted benzenesulfonyl wherein the substituent is alkyl of 1-4 carbon atoms, alkoyl of 1-4 carbon atoms, nitro, chlorine or bromine;
chloromethyl;
bromomethyl;
hydroxymethyl; or
acetoxymethyl.

2. The compound of claim 1 wherein R is mono-substituted benzoyl or mono-substituted benzenesulfonyl.

3. The compound of claim 2 wherein the substituent is substituted in the para-position.

4. The compound of claim 1 wherein R is benzoyl substituted in the para-position by alkyl of 1–4 carbon atoms, alkoxy of 1–4 carbon atoms, nitro, chlorine or bromine.

5. The compound of claim 1 wherein R is benzenesulfonyl substituted in the para-position by alkyl of 1–4 carbon atoms, alkoxy of 1–4 carbon atoms, nitro, chlorine or bromine.

6. The compound of claim 4 wherein R is p-methoxybenzoyl.

7. The compound of claim 1 wherein R is chloromethyl, bromomethyl, hydroxymethyl or acetoxymethyl.

8. The compound of claim 7 wherein R is hydroxymethyl.

9. 2,4,5-tribromo-1-acetoxymethyl imidazole.

10. 2,4,5-tribromo-1-(p-nitrobenzoyl)imidazole.

11. 2,4,5-tribromo-1-(p-chlorobenzene sulfonyl)imidazole.

References Cited

Beilsteins Handbuch Der Organischen Chemie: 4th ed., vol. 23, pp. 49–50, Berlin, Springer, 1936. QD251. B4.

Netherlands Application 6,407,401: January 1965, 9 pages spec. 260–309.

HENRY R. JILES, *Primary Examiner.*

NATALIE TROUSOF, *Assistant Examiner.*

U.S. Cl. X.R.

71—92; 260—239.9